(12) United States Patent
Morford et al.

(10) Patent No.: US 10,401,502 B2
(45) Date of Patent: Sep. 3, 2019

(54) LOW ENERGY WI-FI DEVICE FOR LOCATION

(71) Applicants: Timothy B. Morford, Fultonville, NY (US); Kenneth L. Tomaro, Jr., Gansevoort, NY (US)

(72) Inventors: Timothy B. Morford, Fultonville, NY (US); Kenneth L. Tomaro, Jr., Gansevoort, NY (US)

( * ) Notice: Subject to any disclaimer, the term of this patent is extended or adjusted under 35 U.S.C. 154(b) by 0 days.

(21) Appl. No.: 15/616,094

(22) Filed: Jun. 7, 2017

(65) Prior Publication Data

US 2017/0350987 A1 Dec. 7, 2017

Related U.S. Application Data

(60) Provisional application No. 62/346,820, filed on Jun. 7, 2016, provisional application No. 62/347,233, filed on Jun. 8, 2016.

(51) Int. Cl.
| | |
|---|---|
| *H04W 24/00* | (2009.01) |
| *G01S 19/45* | (2010.01) |
| *G01S 19/42* | (2010.01) |
| *H02J 7/00* | (2006.01) |
| *G01S 19/51* | (2010.01) |
| *H04W 4/02* | (2018.01) |
| *G06K 19/07* | (2006.01) |
| *H02J 50/10* | (2016.01) |
| *H02J 7/35* | (2006.01) |

(52) U.S. Cl.
CPC ............ *G01S 19/45* (2013.01); *G01S 19/421* (2013.01); *G01S 19/51* (2013.01); *G06K 19/0704* (2013.01); *H02J 7/0027* (2013.01); *H02J 7/35* (2013.01); *H02J 50/10* (2016.02); *H04W 4/027* (2013.01)

(58) Field of Classification Search
CPC ........ G01S 19/45; G01S 19/01; H02J 7/0027; H02J 10/50; G06K 19/0704; H04M 1/72519; H04M 1/72525; H04W 64/00; H04W 4/027; H04W 88/02; H04W 8/245; H04W 4/02; H04L 29/08657
USPC ........................ 455/550.1, 418, 456.1, 456.6
See application file for complete search history.

(56) References Cited

U.S. PATENT DOCUMENTS

| | | | | |
|---|---|---|---|---|
| 5,487,181 | A * | 1/1996 | Dailey | H04B 1/40 |
| | | | | 455/557 |
| 9,740,083 | B1* | 8/2017 | Hennings | G03B 15/05 |
| 2003/0034898 | A1* | 2/2003 | Shamoon | G08C 17/02 |
| | | | | 340/12.22 |
| 2003/0149526 | A1* | 8/2003 | Zhou | G01S 5/0027 |
| | | | | 701/408 |
| 2010/0026571 | A1* | 2/2010 | Batty | B63B 45/00 |
| | | | | 342/357.34 |
| 2011/0081634 | A1* | 4/2011 | Kurata | G01C 21/20 |
| | | | | 434/236 |

(Continued)

*Primary Examiner* — Danh C Le

(74) *Attorney, Agent, or Firm* — Matthew M. Hulihan; Heslin Rothenberg Farley & Mesiti PC

(57) ABSTRACT

A wireless device includes a wireless antenna, a power supply, and a movement sensor, the wireless device configured for triggered sending of wireless signals to one or more receiving devices to determine location of the wireless device, and the wireless device comprising a connection for external power, a connection for programming, and a connection for self-charging.

16 Claims, 4 Drawing Sheets

(56) References Cited

U.S. PATENT DOCUMENTS

| | | | |
|---|---|---|---|
| 2013/0099918 A1* | 4/2013 | Dunst | G08B 21/0211 |
| | | | 340/539.12 |
| 2013/0324151 A1* | 12/2013 | Lee | H04W 24/00 |
| | | | 455/456.1 |
| 2015/0133158 A1* | 5/2015 | Tofighbakhsh | H04W 4/02 |
| | | | 455/456.2 |
| 2016/0099596 A1* | 4/2016 | Chien | H02J 7/0052 |
| | | | 368/10 |
| 2016/0242007 A1* | 8/2016 | Mihara | H04W 76/10 |
| 2016/0297361 A1* | 10/2016 | Drazan | H04N 7/181 |
| 2016/0360338 A1* | 12/2016 | Lyman | H04W 4/001 |
| 2016/0360382 A1* | 12/2016 | Gross | G06F 3/0488 |
| 2018/0315090 A1* | 11/2018 | Greenberger | G06Q 30/0261 |

\* cited by examiner

LOW ENERGY WI-FI DEVICE FOR LOCATION

BACKGROUND

Devices that emit a wireless (e.g. Wi-Fi) signal may be useful when running, i.e. the device is to be in some running state in order to emit the Wi-Fi signal, but consume energy from a battery or other power source to do so. When running on a limited capacity power source, such as a battery, the power source life expectancy can be as little as a few hours or less. Consequently, there is a tradeoff between the desire for the Wi-Fi device to emit a signal, for instance one by which the device location can be measured, and the desire to conserve energy from a limited-capacity power source, leading to problems when trying to locate the Wi-Fi device (or object affixed to or incorporating the Wi-Fi device).

SUMMARY

Aspects described herein present a low powered wireless (e.g. Wi-Fi) signal emitting device for use in locating objects or people, as examples. Example such devices are configured to be light weight and portable, and powered by one or more different sources including: solar, micro USB (5 volt, for example), and/or induction power. An example device emits a signal when movement of the device is detected and/or at specific (e.g. pre-specified and/or scheduled) time based intervals, thus reserving its power, in some examples, to when location change is detected. Example devices can come in a variety of sizes tailored to different desired applications. Example devices can be programmed to act, perform, behave, emulate, etc. as a web server and send data to other one or more Wi-Fi enabled devices that can accept data in one or more desired format(s), such as HTTP, XML, and/or other common languages. The device can be powered by USB 5-volt, a 5 volt wall charger, induction charging, and/or solar power, as examples.

The low power consumption device may be used for location purposes when in communication with Wi-Fi access point(s). The device may be powered by one or more onboard batteries which may be charged by solar, micro-USB, and/or induction power sources as examples. An example device can emit an 802.11 signal in a range of 0 to 400 meters, for example, and additionally or alternatively may have optional Global Positioning System (GPS) capabilities to track location outside of Wi-Fi range.

Accordingly, shortcomings of prior art are overcome and additional advantages are provided through the provision of a wireless (e.g. Wi-Fi) device that includes a wireless (e.g. Wi-Fi) antenna, a power supply, and a movement sensor, the wireless (e.g. Wi-Fi) device configured for triggered sending of wireless (e.g. Wi-Fi) signals to one or more receiving devices to determine location of the wireless (e.g. Wi-Fi) device, and the wireless (e.g. Wi-Fi) device including a connection for external power, a connection for programming, and a connection for self-charging.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects described herein relate to the field of location via wireless (e.g. Wi-Fi technology) devices and more specifically a device that may be low powered and may run for a period of time spanning, e.g., many months, charged by low voltage (e.g. 5 volt) power supply, USB power, solar power, and/or induction power, as examples, and can send out a signal at, e.g. specified time(s) and/or trigger the sending of the signal based on movement, in order to communicate with Wi-Fi access point(s) to show its location.

Devices may be used for determining location, many examples of such devices being Wi-Fi enabled devices. Cellular telephones and other types of mobile devices, such as tablets and wearable mobile devices, can be used to emit a Wi-Fi signal and can be located on a map of a building or a map of Earth, as examples. Wi-Fi enabled devices may be used to locate items (automobile, mobile device, etc.) or people that remain in close proximity to the Wi-Fi device, for instance items/people to which the device is affixed or are otherwise proximate the Wi-Fi device. Devices that emit Wi-Fi signal are useful when they are running (i.e. the device is to be running in order to emit the Wi-Fi signal). While running, these devices consume energy from a battery or from a power source in which case the device is likely plugged in. When using a battery, the battery life expectancy can be as little as a few hours.

In some examples, access points can be used to determine location by triangulating a Wi-Fi device described herein. Once the triangulation has occurred, Wi-Fi routers or the GPS signal being uploaded can show placement of the device on a map, for instance a map of a building or a map of Earth. Similarly, other devices. such as computers. can be used to detect Wi-Fi devices and use the Receiver Signal Strength Indication or RSSI to determine the distance from the computer. Once the distance is determined, Wi-Fi Routers or GPS signal can triangulate the Wi-Fi device and show it on a map.

Some Wi-Fi enabled devices are portable and some are stationary. In some cases, stationary Wi-Fi enabled devices do not need to be located on a map as they are in known locations and are attached to a power source. In some cases, the location of stationary Wi-Fi enabled devices are shown on a map for the purpose of determining distance from that stationary Wi-Fi router to Wi-Fi emitting device.

Figure 1:
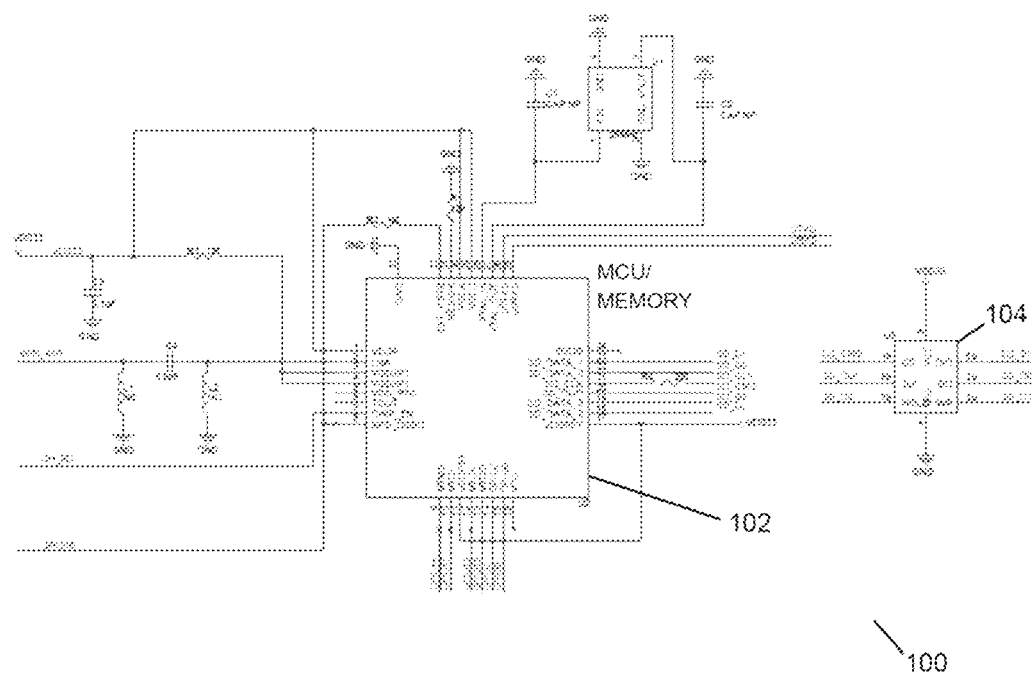
FIG. 1 shows a schematic layout of a Wi-Fi chip/circuit for inclusion in a Wi-Fi device in accordance with aspects described herein.

FIG. 1 shows a schematic layout of a Wi-Fi chip/circuit 102 for inclusion in a Wi-Fi device 100 in accordance with aspects described herein. The circuit 102 has multiple input and output ports for communications. The circuit 102 is powered by 3.3 volts (on port labeled 1) via VDD33 line. There is an external reset port (labeled 32) in conjunction with GPIO16 port (labeled 8) which act as a manual reset to the system if 3.3 volts (as an example) is detected.

There is a Wi-Fi antenna (labeled 2) which can support external usage. Ports labeled 9, 10, 12, 13, 14, 15 are for external use to detect voltage; e.g. when a vibration sensor is hooked to the VDD33 and to the GPIO14, for example, we can tell the device to wake when the device senses vibration or motion. Sleep mode can turn off all un-necessary LEDs and ports, resulting in a total power draw of 0.5 mAh, as an example. While awake, the system can send out data or ping the Wi-Fi access points with a total power draw of 80 mAh, as an example.

Figure 2:
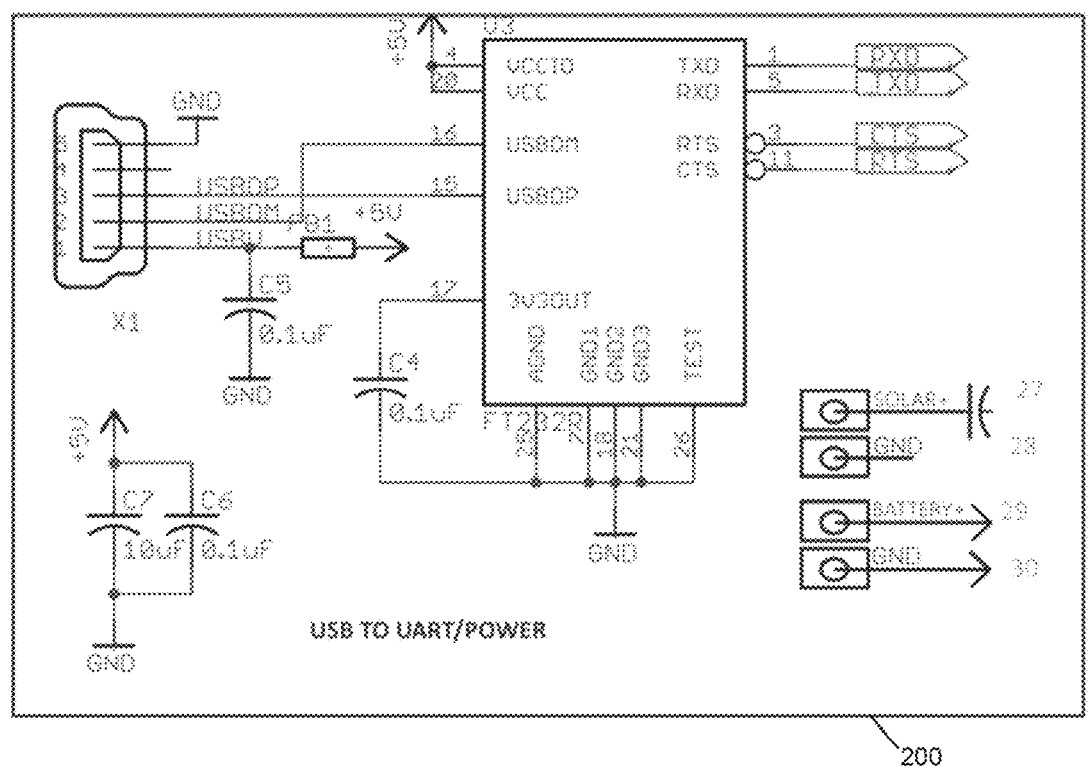
FIG. 2 shows a schematic layout of a Universal Serial Bus (USB) connection to a Wi-Fi device in accordance with aspects described herein.

Further regarding the Wi-Fi device 102, UTXD in FIG. 1 (port labeled 26) connects to RXD in FIG. 2 (port labeled 1 therein). URXD in FIG. 1 (port labeled 25) connects to TXD in FIG. 2 (port labeled 5). This can allow for asynchronous communication. The transmission (TX in FIG. 3) and receive (RX in FIG. 3) ports of the Global Positioning System (GPS) device of FIG. 3 can be used to connect to the Wi-Fi device of FIG. 1.

In particular embodiments, Wi-Fi device 102 is or comprises a microcontroller unit (MCU)/Memory, for instance a 32-bit Reduced Instruction Set Architecture (RISC)-based central processing unit (CPU) running at 80 megahertz with 64 kilobytes of instruction memory and 128 kilobytes of Random Access Memory. Accordingly, the Wi-Fi device may process/execute instructions, for instance by the CPU(s) of the device executing instruction(s) obtained from memory (RAM), to perform aspects described herein.

A real-time clock 104 is also shown in FIG. 1 with connections labeled 1b, 2b, 3b, 4b, 5b, 6b. Data can also be collected and stored in an onboard flash memory, for instance an internal memory which includes, for example, 1 megabyte of flash memory, as an example.

FIG. 2 shows a schematic layout of a Universal Serial Bus (USB) connection to a Wi-Fi device in accordance with aspects described herein. USB 200 connection may be used for programming of the Wi-Fi device and for powering the Wi-Fi device. Since USB may be 5-volt, the system can be stepped down to 3.3 volts. The USB can power the device while plugged in and it can also be used to program the device. RXD (port labeled 5 in FIG. 2) can connect to UTXD in FIG. 1 (port labeled 26 in FIG. 1). TXD (port labeled 1 in FIG. 2) can connect to URXD in FIG. 1 (port labeled 25). This can allow for asynchronous communication. 3V3OUT (port labeled 17 in FIG. 2) can send power to VDD33 of FIG. 1 (port labeled 1). Battery+ (labeled 29 in FIG. 2) can connect to the positive terminal of a battery (no pictured), while GND (labeled 30 in FIG. 2) can connect to the negative terminal of the battery. Solar+ (labeled 27 in FIG. 2) can connect to the positive terminal of a solar panel for external power source, while GND (labeled 28 in FIG. 2) can connect to the negative terminal of the solar panel. Note that Solar+ and GND can additionally or alternatively be attached to an induction coil for powering the device.

Figure 3:
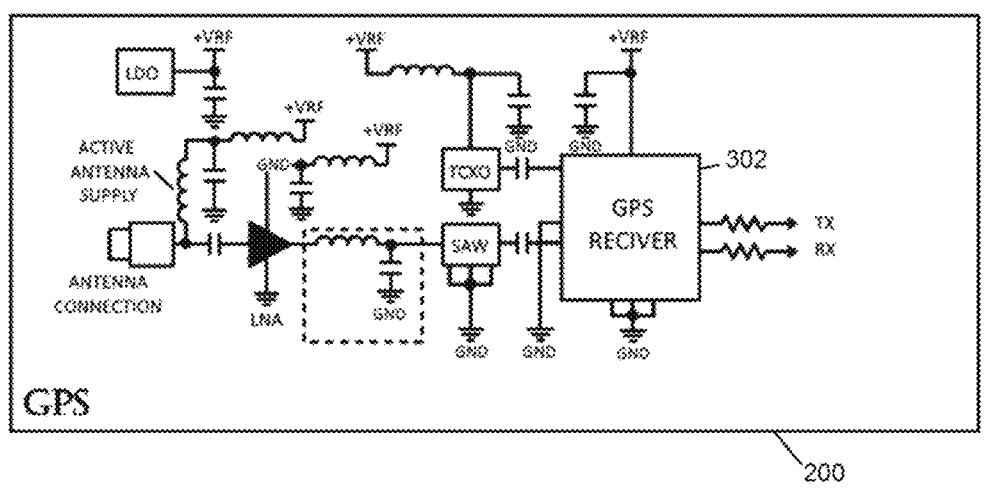
FIG. 3 shows a schematic of a Global Positioning System (GPS) device connection to a Wi-Fi device in accordance with aspects described herein.

FIG. 3 shows a schematic of a Global Positioning System (GPS) device 300 connection to a Wi-Fi device in accordance with aspects described herein. A GPS receiver 302 can have a built-in antenna and a connection for external antenna. +VRF, connects to VCC of FIG. 1 for 3.3V power (in this example). The TX in FIG. 3 (labeled TX) may be connected to URXD of FIG. 1 (labeled 25 in FIG. 1), while RX in FIG. 3 (labeled RX) may be connected to UTXD (of FIG. 1 (labeled 26). The GPS device 300 may receive a signal from satellite(s), which may show latitude and longitude, speed (e.g. in knots or any other unit), and altitude if connected to at least some minimum number, e.g. 4, satellites. Data may be sent to the Wi-Fi circuit of FIG. 1 until the time it finds a Wi-Fi connection. Once the Wi-Fi connection is established, the data may be uploaded to a waiting server.

An example Wi-Fi device described herein may include a Wi-Fi chip and board electrically coupled to a USB charging port, a USB programming port, a battery, and solar panels.

Figure 4:
FIG. 4 depicts an example map showing an overhead view of an area with receiving devices and Wi-Fi device locations determined based on aspects described herein.

FIG. 4 depicts an example map showing an overhead view of an area with access points 1, 2, 3 and Wi-Fi devices 4, 5, 6, 7, 8, and 9, locations of which may be determined based on aspects described herein.

Accordingly, in some aspects a Wi-Fi device described herein can be of low power consumption (e.g. 0.5 mAh to 80 mAh), and capable of sending a Wi-Fi signal. The Wi-Fi device can include a housing for circuitry. Additionally or alternatively, the device includes a way to externally power the device, e.g. via mini USB 5 volt connection. Additionally or alternatively, the device includes a way to program the device, e.g. via mini USB 5 volt connection. Additionally or alternatively, the device includes a connection for solar capabilities for self-charging.

The low power consumption device may have an average power usage of 0.5 milliamperes (mA) (+/−7%) when in sleep mode. The low power consumption device may have an average power usage of about 157 mA (+/−10%) while emitting a Wi-Fi signal. In some examples, the Wi-Fi device, when in signal emitting mode, sends out a 802.11n signal at a range between 350 m and 400 m.

The Wi-Fi signal may be a 802.11 signal which can be received by one or more access point(s) and RSSI (Receiver Signal Strength Indication)-read to determine location of the Wi-Fi device. In some examples, the Wi-Fi device can initiate Global Positioning System to relay its position via 802.11.

In some examples, the Wi-Fi device can be programmed by a Wi-Fi connection.

In some examples, the Wi-Fi device can send the signal when motion is detected via an accelerometer, vibration sensor, or Global Positioning System sensor of the Wi-Fi device.

In some examples, while in signal emitting mode, the Wi-Fi device can send messages to devices with a web browser.

In some examples, the location information can then be sent to a server and stored electronically.

In some examples, if no Wi-Fi connection is available, the Wi-Fi device can store the Global Positioning System (location) data in memory and send the location data to a server when a Wi-Fi connection becomes available.

The following presents example power usage in a day (24 hours) for a stationary Wi-Fi device: 0.5 mAh is used on wake every 5 minutes for 5 second signal processing. For 288 times a day, the device expends 135 mAh of energy each time in wake mode. 0.0375 mA per second as calculated as ((135 mAh/60 seconds)/60 minutes)×5×288=54 mAh in pings and 11.7999992448 mAh ((((0.5/60 seconds)/60 minutes)×(86400−1440)) in sleep power, for a total of 65.7999992448 mA for a 24-hour period. In this example, on a 2000 mAh battery, the device will last 31 days without needing to be charged.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A wireless device comprising a wireless antenna, a power supply, and a movement sensor, the wireless device configured for triggered sending of wireless signals to one or more receiving devices to determine location of the wireless device, configured to send, at a pre-specified time, a wireless signal to a receiving device to determine location of the wireless device, and further configured to trigger, based on detecting movement by way of the movement sensor, sending a wireless signal to a receiving device to determine location of the wireless device, and the wireless device comprising a connection for external power, a connection for programming, and a connection for self-charging.

2. The wireless device of claim 1, wherein the wireless device is configured to consume between 0.5 milliampere hour and 135 milliampere hour.

3. The wireless device of claim 1, wherein the movement sensor comprises one or more of an accelerometer, a vibration sensor, or a Global Positioning System sensor.

4. The wireless device of claim 1, wherein the wireless device is initially in a sleep mode and wherein detecting movement wakes the wireless device from sleep mode into a wake mode for sending the wireless signal.

5. The wireless device of claim 1, wherein the wireless device is configured to send, on a time-based interval, a wireless signal to a receiving device to determine location of the wireless device.

6. The wireless device of claim 5, wherein detecting the movement wakes the wireless device from a sleep mode into a wake mode, and wherein the wireless device commences sending of the wireless signal to the receiving device according to the time-based interval based on entering the wake mode.

7. The wireless device of claim 1, wherein a receiving device of the one or more receiving devices is a wireless access point to which the wireless device is in wireless communication.

8. The wireless device of claim 1, wherein the power supply comprises a battery configured for charging by a solar power source, universal serial bus power source, or induction power source.

9. The wireless device of claim 1, wherein the wireless device is configured to derive power from a five-volt power source.

10. The wireless device of claim 9, wherein the five-volt power source comprises a USB connection for both powering and programming the wireless device.

11. The wireless device of claim 1, wherein the wireless signals comprises 802.11 signals in a range of 350 meters to 400 meters.

12. The wireless device of claim 1, further comprising a Global Positioning System (GPS) device, wherein the wireless device is configured to perform, based on no Wi-Fi connection being available to the wireless device, storing location data from the GPS device, and, based on the wireless device establishing a Wi-Fi connection, uploading the stored location data to a remote device.

13. The wireless device of claim 1, further comprising an induction power source for wireless self-charging.

14. The wireless device of claim 1, wherein the wireless device is a mobile device.

15. The wireless device of claim 1, wherein the wireless device is a Wi-Fi device, the wireless antenna is a Wi-Fi antenna, and the wireless signals are Wi-Fi signals.

16. The wireless device of claim 1, further comprising a solar power source for the self-charging.

* * * * *